(12) United States Patent
Kim

(10) Patent No.: US 6,873,700 B2
(45) Date of Patent: Mar. 29, 2005

(54) SYSTEM AND METHOD FOR ANNOUNCING A MESSAGE THROUGH A PRIVATE BRANCH EXCHANGE

(75) Inventor: Yong-Sang Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 791 days.

(21) Appl. No.: 09/897,245

(22) Filed: Jul. 2, 2001

(65) Prior Publication Data

US 2002/0025831 A1 Feb. 28, 2002

(30) Foreign Application Priority Data

Aug. 31, 2000 (KR) .......... 2000-51036

(51) Int. Cl.[7] .............. H04M 3/428; H04M 3/487; H04M 7/00
(52) U.S. Cl. ............ 379/233; 379/88.25; 379/163; 379/201.01; 379/393
(58) Field of Search .............. 379/67.1, 88.22, 379/33.23, 88.25, 101.01, 157, 162, 163, 201.01, 207.03, 231, 232, 233, 393

(56) References Cited

U.S. PATENT DOCUMENTS

| 4,468,528 A | * | 8/1984 | Reece et al. .......... 379/84 |
|---|---|---|---|
| 5,321,740 A | * | 6/1994 | Gregorek et al. ........ 379/88.22 |
| 5,428,670 A | * | 6/1995 | Gregorek et al. ......... 379/67.1 |
| 5,473,672 A | * | 12/1995 | Khalid .............. 379/88.22 |
| 5,535,269 A | * | 7/1996 | Hamada ............. 379/233 |
| 5,546,454 A | * | 8/1996 | Harrington ........... 379/266.01 |
| 5,557,658 A | | 9/1996 | Gregorek et al. ........ 379/88.25 |
| 5,991,374 A | | 11/1999 | Hazenfield ........... 379/101.01 |

OTHER PUBLICATIONS

European Search Report dated Jun. 25, 2003 issued in a counterpart application, namely Appln. No. 01118565.9.

* cited by examiner

Primary Examiner—Harry S. Hong
(74) Attorney, Agent, or Firm—Dilworth & Barrese, LLP

(57) ABSTRACT

There is provided an announcing method for a notification message in a PBX. The PBX stores the index of a predetermined hold notification message for a corresponding DID (Direct Inward Dialing) number upon incoming a call from a DID office line in a call processing buffer, connects the call between the office line and a corresponding extension line, then announces the hold notification message corresponding to the stored index when the call is placed on hold during the call.

9 Claims, 4 Drawing Sheets

| INDEX | CALLED NUMBER | CALLED EXTENSION NUMBER | NOTIFICATION MESSAGE |
|---|---|---|---|
| 1 | 7500 | 2100 | 1 |
| 2 | 7501 | 2101 | 1 |
| 3 | 7502 | 2102 | X |
| 4 | 7503 | 2103 | X |
| 5 | 7600 | 2100 | 2 |
| 6 | 7601 | 2101 | 2 |
| 7 | 7602 | 2102 | X |
| 8 | 7603 | 2103 | X |
| ⋮ | ⋮ | ⋮ | ⋮ |
| n−1 | X | X | X |
| n | X | X | X |

FIG. 3

| OFFICE LINE INDEX | REGISTERED NOTIFICATION MESSAGE | STORED NOTIFICATION MESSAGE |
|---|---|---|
| 701 | 5 | X |
| 702 | 5 | 1 |
| 703 | 5 | X |
| 704 | 4 | X |
| 705 | 4 | 2 |
| 706 | 4 | X |
| ⋮ | ⋮ | ⋮ |
| n−1 | 6 | X |
| n | 6 | X |

FIG. 4

SYSTEM AND METHOD FOR ANNOUNCING A MESSAGE THROUGH A PRIVATE BRANCH EXCHANGE

PRIORITY

This application claims priority to an application entitled "Announcing Method in Private Branch Exchange" filed in the Korean Industrial Property Office on Aug. 31, 2000 and assigned Ser. No. 2000-51036, the contents of which are hereby incorporated by reference.

BACKGROUND OF THE INVENTION

1. Field of the Invention

The present invention relates generally to announcement of a notification message in a PBX (Private Branch Exchange) such as a key phone system, and in particular, to a method of announcing different notification messages according to called telephone numbers when an incoming DID (Direct Inward Dialing) call is put on hold.

2. Description of the Related Art

When an incoming call is placed on hold, a conventional PBX outputs a predetermined melody or announces a notification message preset depending on whether the call is to an office line or to an extension line. In this conventional method, no distinction is made between different called telephone numbers incoming via an identical office line.

For example, if the telephone number of a purchasing department is 200-7000 and that of a sales department is 200-8000 in a company and they are called via an identical office line, the same notification message is announced despite different characteristics of the incoming calls. As a result, no distinction is made between different types of calls incoming via a single office line with a great capacity like E1 (European level 1) or PRI (Primary Rate Interface).

There exists a need for an apparatus and method that allows an incoming call, received through a PBX system, to receive a distinct message, from the PBX system, to an office line or an extension line.

SUMMARY OF THE INVENTION

It is, therefore, an object of the present invention to provide an announcing method in which different hold notification messages are announced according to called numbers in a PBX.

To achieve the above object, a notification message announcing method is provided in a PBX. The PBX stores the index of a predetermined hold notification message for a corresponding DID (Direct Inward Dialing) number upon receipt of an incoming call from a DID office line, in a call processing buffer. The PBX connects the call between the office line and a corresponding extension line, and announces the hold notification message corresponding to the stored index of the predetermined hold notification message when the call is placed on hold during the call.

BRIEF DESCRIPTION OF THE DRAWINGS

The above and other objects, features and advantages of the present invention will become more apparent from the following detailed description when taken in conjunction with the accompanying drawings in which:

FIG. 3 is a DID call termination table according to the embodiment of the present invention; and FIG. 4 illustrates a call processing buffer according to the embodiment of the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
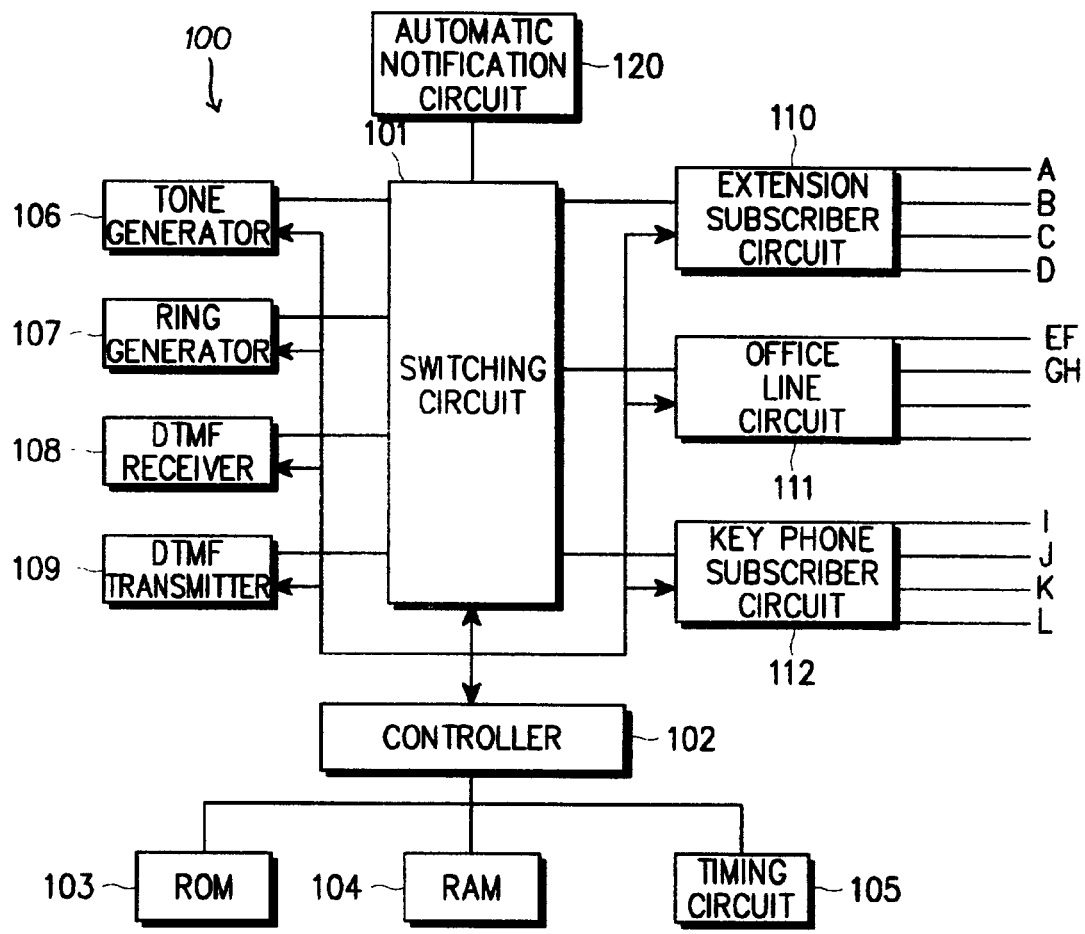
FIG. 1 is a block diagram of a PBX to which the present invention is applied.

Referring to FIG. 1, there is an illustration of a PBX 100. The PBX 100 is comprised of a switching circuit 101, a controller 102, a Read Only Memory (ROM) 103, a Random Access memory (RAM) 104, a timing circuit 105, a tone generator 106, a ring generator 107, a Dual Tone Modulation Frequency (DTMF) receiver 108, a DTMF transmitter 109, extension subscriber circuit 110, office line circuit 111, key phone subscriber circuit 112, and an automatic notification circuit 120. Those or ordinary skill in the art recognize that a PBX may include more elements than those recited above. Controller 102 provides overall control to PBX 100 according to a predetermined program stored in ROM 103. The ROM 103 stores an initialization program and an operation program for the controller 102. RAM 104 stores extension numbers and data generated during switching operations.

Switching circuit 101 establishes a loop to switch between an extension line and an office line under the control of the controller 102. An office line circuit 111 connects a plurality of office lines linked to a central office exchange (not shown) to the switching circuit 101. The office line circuit 111 also detects a ring signal incoming via an office line and feeds it to the controller 102. Extension line circuits are largely divided into an extension subscriber circuit 110 connected to extension subscribers and a key phone subscriber circuit 112 connected to key phone subscribers. The extension subscriber circuit 110 monitors a plurality of extension subscribers (extension telephones) and supplies a speech current during a call. The extension subscriber circuit 110 also connects the extension telephones to the switching circuit 101 under the control of the controller 102.

The key phone subscriber circuit 112 monitors the key phone subscribers (key phones) and supplies a speech current to them during a call. The key phone subscriber circuit 112 is connected to the key phones via a voice line and a data line, and connects the key phones to the switching circuit 101 under the control of the controller 102. Ring generator 107 generates a ring signal under the control of the controller 102 upon receipt of a request for connection to a particular extension subscriber via the office line circuit 111, the extension subscriber circuit 110, and the key phone subscriber circuit 112. DTMF transmitter 109 receives the ring signal, from ring generator 107, then converts the ring signal to a DTMF signal (special signal). DTMF transmitter 109, then sends the DTMF signal to DTMF receiver 108 where the DTMF receiver 108 converts the DTMF signal to predetermined data. Next, DTMF receiver 108 transfers the predetermined data to the automatic notification circuit 120. Automatic notification circuit 120 receives the predetermined data from DTMF receiver 108 via an office line to a corresponding extension subscriber in an automatic notification mode. The automatic notification circuit 120 also outputs a voice notification message required for call forwarding. If the automatic notification circuit 120 is an external device to the PBX 100, then the ring signal is generated by the ring generator 107 and the information is sent from the DTMF transmitter 109 to DTMF receiver 108 to the automatic notification circuit 120. However, if the automatic notification circuit 120 is an internal device of the PBX 100, then the automatic notification circuit 120 receives the ring signal from an interface generated by the internal property IPC (inter processor communication) message.

Figure 2:
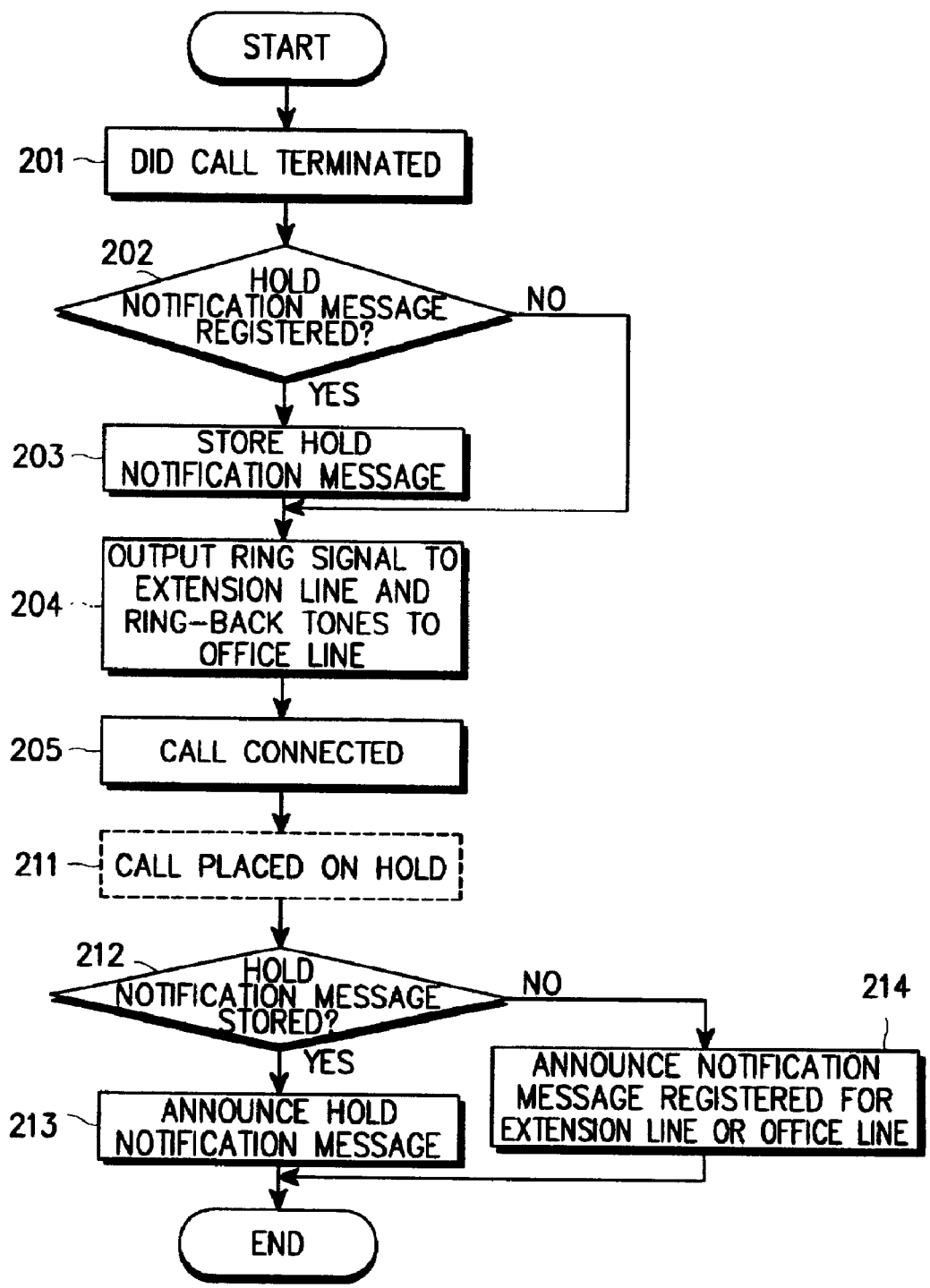
FIG. 2 is a flowchart illustrating a method of announcing different notification messages based on called numbers according to an embodiment of the present invention.

The operation of the thus-constituted PBX according to the present invention will be described in detail hereinbelow. FIG. 2 is a flowchart illustrating a method of announcing notification messages received in a PBX according to called numbers. FIGS. 3 and 4 illustrate a DID call termination table and a call processing buffer, respectively.

Referring to FIG. 2, upon incoming of a call via a DID office line in step 201, the controller 102 determines whether a hold notification message is registered for a corresponding DID number referring to a DID call termination table stored in the RAM as shown in FIG. 3. Those of ordinary skill in the art recognize that other types of calls or dialing systems may be utilized to send an incoming call to an office line or extension line besides DID. In step 202, controller 102 determines if the hold notification message is registered. In step 203, if the hold notification message is registered, the controller 102 stores the hold notification message in the call processing buffer as shown in FIG. 4 and then proceeds to step 204. If no hold notification message is registered, the procedure jumps from step 202 to step 204. The controller 102 generates a ring signal to a called extension number and connects ring-back tones to the DID office line. Hold notification messages according to the DID numbers are registered as shown in FIG. 3 in a preliminary option setting operation.

For example, if a call from a called number #7600 is incoming via a DID office line #705, the controller 102 generates a ring signal to an extension number #2100 referring to the table shown in FIG. 3 and stores the index of a notification message registered in the DID call termination table in the call processing buffer. At the same time, ring-back tones are connected to the DID office line. The index of the notification message stored for the office line #705 is 2 in FIG. 4, by way of example.

In step 205, if the called extension subscriber answers, the call is connected and the ring signal at the extension number and the ring-back tones to the office line are terminated. In this state, if the called subscriber holds the call then, in step 212 it is determined whether a hold notification message is stored for the DID office line. If it is stored, the hold notification message is announced in step 213. If there is no hold notification message stored, a hold notification message preset for an extension line or an office line is announced in step 214.

For example, though a notification message #4 is registered for the office line #705 in the call processing buffer, a hold notification message #2 is stored when a call is terminated via the office line. Therefore, the hold notification message #2 is connected to the office line instead of the hold notification message #4.

Different notification messages are not announced according to called numbers in the case where calls directed to different DID numbers are terminated via an office line, answered, and then held in the conventional method. A different notification message can be generated according to the number of a called party referring to a DID call termination table while a called extension line is detected based on the corresponding DID number.

While a ring signal is output to an extension line and ring-back tones to an office line in step 204, a notification message stored in step 203 can be connected to the office line instead of the ring-back tones according to a predetermined option in another embodiment of the present invention.

It is further contemplated as a third embodiment of the present invention that a notification message is additionally registered for each DID number in the DID call termination table and announced instead of ring-back tones so that a different notification message can be announced instead of the ring-back tones according to called number.

In accordance with the present invention as described above, predetermined different hold notification messages are announced according to called numbers. Furthermore, different notification messages are preliminarily registered in a DID call termination table to be announced instead of ring-back tones.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A voice notification message announcing method in a private branch exchange (PBX), comprising the steps of:
    storing an index of predetermined hold notification message for a corresponding DID (Direct Inward Dialing) number upon receipt of an incoming call from a DID office line in a call processing buffer;
    connecting the call between the DID office line and a corresponding extension line; and
    announcing the hold notification message corresponding to the stored index of the predetermined hold notification messages when the call is placed on hold during the call.

2. The voice notification message announcing method of claim 1, wherein the hold notification message is output to the office line instead of ring-back tones in the call connecting step.

3. The voice notification message announcing method of claim 1, wherein the index of the predetermined hold notification message for the corresponding DID number is additionally stored in the call processing buffer and the predetermined hold notification message is output to the office line.

4. A method for sending a notification message in a PBX, the method comprising:
    generating a ring signal upon receipt of a request for connection to an extension subscriber by one of an office line circuit, an extension subscriber circuit and a key phone subscriber circuit;
    receiving the ring signal and converting it into a special signal, by utilizing a transmitter, under a control of the controller;
    converting the special signal, by utilizing a receiver, to predetermined data;
    sending the predetermined data to a controller; and
    transferring the predetermined data, by an automatic notification circuit, to a corresponding extension subscriber in an automatic notification mode, whereby the automatic notification circuit receives the predetermined data from the receiver and sends it through the switching circuit to the corresponding office line circuit, extension subscriber and key phone subscriber circuit.

5. The method of claim 4, wherein the special signal is a Dual Tone Modulation Frequency (DTMF) signal.

6. The method of claim 4, wherein the receiver is a Dual Tone Modulation Frequency (DTMF) signal.

7. The method of claim 4, wherein the transmitter is a Dual Tone Modulation Frequency (DTMF) transmitter.

8. A method for sending a message in a PBX, the method comprising:

receiving a call;

determining whether a hold notification message is registered for a corresponding call number by referring to a call termination table stored in a RAM;

generating a ring signal to an extension number called by utilizing the controller;

connecting a plurality of ring-back tones to an office line of an extension number of the call;

terminating the ring signal at the extension number and the ring-back tones to the office line if the extension number answers, if the extension number holds the call, then it is determined whether the hold notification message is stored for the office line;

announcing the hold notification message if the hold notification message is stored for the office line; and announcing a preset for the hold notification message, if there is no hold notification message stored for the office line.

9. The method of claim 8, wherein the call is a Direct Inward Dialing (DID) call.

* * * * *